United States Patent
Kang et al.

(10) Patent No.: US 6,833,638 B2
(45) Date of Patent: Dec. 21, 2004

(54) INTEGRATED SYSTEM FOR NON-CONTACT POWER FEED DEVICE AND PERMANENT MAGNET-EXCITED TRANSVERSE FLUX LINEAR MOTOR

(75) Inventors: Do Hyun Kang, Kyungsangnam-do (KR); Jong Moo Kim, Kyungsangnam-do (KR)

(73) Assignee: Korea ElectroTechnology Research Institute, Kyungsangnam-Do (KR)

( * ) Notice: Subject to any disclaimer, the term of this patent is extended or adjusted under 35 U.S.C. 154(b) by 0 days.

(21) Appl. No.: 10/393,363

(22) Filed: Mar. 21, 2003

(65) Prior Publication Data

US 2004/0007922 A1 Jan. 15, 2004

(30) Foreign Application Priority Data

Mar. 21, 2002 (KR) ........................................ 2002-15468

(51) Int. Cl.[7] ............................................. H02K 41/00
(52) U.S. Cl. ......................................................... 310/12
(58) Field of Search ....................... 310/12–14; 335/274

(56) References Cited

U.S. PATENT DOCUMENTS

| | | | | |
|---|---|---|---|---|
| 4,257,272 A | * | 3/1981 | Sloman | ........................ 73/633 |
| 4,607,167 A | * | 8/1986 | Petric | ...................... 250/492.2 |
| 5,293,308 A | * | 3/1994 | Boys et al. | .................... 363/37 |
| 6,075,297 A | * | 6/2000 | Izawa et al. | ................... 310/12 |
| 6,307,766 B1 | * | 10/2001 | Ross et al. | ................... 363/144 |
| 6,515,878 B1 | * | 2/2003 | Meins et al. | .................. 363/37 |

OTHER PUBLICATIONS

Cheng–Tsung Liu et al. "Operational Stability Enhancement Analysis of a Transvers Flux Linear Switch–Reluctance Motor." IEE Transactions of Magnetics vol. 35 No. 5, Sep., 2000.*

* cited by examiner

Primary Examiner—Thanh Lam
Assistant Examiner—Judson H. Jones
(74) Attorney, Agent, or Firm—Rothwell Figg Ernst & Manbeck, P.C.

(57) ABSTRACT

Disclosed is an integrated system of a non-contact power feed device and a permanent magnet-excited transverse flux linear motor, in which a conventional structure of the permanent magnet-excited transverse flux linear motor system is still used and a driving force and non-contact type power are supplied to a shifter of the permanent magnet-excited transverse flux linear motor, thereby eliminating defects of the electrical power supply system occurring due to the contact friction. The integrated system of the non-contact power feed device and the permanent magnet-excited transverse flux linear motor comprises a permanent magnet-excited transverse flux linear motor including: a motor shifter having permanent magnets; and a motor stator having a motor stator core and a stator coil wound on the motor stator core; and a non-contact power feed device including: a transformer shifter having a transformer shifter core and a transformer secondary coil wound on the core, and moving together with the motor shifter; and a transformer stator having a transformer stator core and a transformer stator primary coil wound on the core, wherein the transformer shifter is separated from the transformer stator by a gap.

25 Claims, 18 Drawing Sheets

INTEGRATED SYSTEM FOR NON-CONTACT POWER FEED DEVICE AND PERMANENT MAGNET-EXCITED TRANSVERSE FLUX LINEAR MOTOR

BACKGROUND OF THE INVENTION

1. Field of the Invention

The present invention relates to an integrated system of a non-contact power feed device and a permanent magnet-excited transverse flux linear motor, in which a conventional structure of the permanent magnet-excited transverse flux linear motor system is still used without an additional transformer and non-contact type power is supplied to a shifter of the permanent magnet-excited transverse flux linear motor, thereby being advantageous in terms of simplification of its structure and economic efficiency.

2. Description of the Related Art

In a conventional permanent magnet-excited transverse flux linear motor system, contact type power is supplied to a shifter by a cable or a bus bar. Otherwise, in order to supply non-contact type power to the shifter, a transformer provided with a gap therebetween is required. In case of supplying the contact type power to the shifter of the permanent magnet-excited transverse flux linear motor system by the cable or the bus bar, the structure of the system becomes complicated and defects of the system easily occur due to the contact friction.

SUMMARY OF THE INVENTION

Therefore, the present invention has been made in view of the above problems, and it is an object of the present invention to provide an integrated system of a non-contact power feed device and a permanent magnet-excited transverse flux linear motor, in which a conventional structure of the permanent magnet-excited transverse flux linear motor system is still used and a driving force and non-contact type power are supplied to a shifter of the permanent magnet-excited transverse flux linear motor, thereby eliminating defects of the system occurring due to the contact friction.

In accordance with one aspect of the present invention, the above and other objects can be accomplished by the provision of an integrated system of a non-contact power feed device and a permanent magnet-excited transverse flux linear motor, comprising:

a permanent magnet-excited transverse flux linear motor including:

a motor shifter having permanent magnets; and a motor stator having a motor stator core and a stator coil wound on the motor stator core; and a non-contact power feed device including:

a transformer shifter having a transformer shifter core and a transformer secondary coil wound on the core, and operating together with the motor shifter; and a transformer stator having a transformer stator core and a transformer stator primary coil wound on the core, wherein the transformer shifter is separated from the transformer stator by a gap.

In accordance with another aspect of the present invention, there is provided an integrated system of a poly-phase non-contact power feed device and a permanent magnet-excited transverse flux linear motor, comprising:

a permanent magnet-excited transverse flux linear motor including:

a motor shifter having permanent magnets; and a motor stator having a motor stator core and a stator coil wound on the motor stator core;

at least two non-contact power feed devices, each device including:

a transformer shifter having a transformer shifter core and a transformer secondary coil wound on the core, and operating together with the motor shifter; and a transformer stator having a transformer stator core and a transformer stator primary coil wound on the core, wherein the transformer shifter is separated from the transformer stator by a gap;

shifter supporting means for supporting the motor shifter and the transformer shifter; and stator supporting means for supporting the motor stator.

Preferably, the shifter supporting means may be supported by the stator supporting means through linear bearings.

Further, preferably, the transformer stator core may be jointed integrally with the motor stator core, and the motor stator coil may serve as the transformer stator primary coil.

Preferably, the transformer stator cores and the motor stator cores may be U-shaped, and the U-shaped transformer stator cores and the U-shaped motor stator cores may be alternately and continuously arranged in line.

Moreover, preferably, each of the motor stator coil and the transformer stator primary coil may include a pair of coils wound on two protrusions of the motor stator cores and the transformer stator cores.

Preferably, a non-magnetic material may be interposed between the transformer stator core and the motor stator core so as to separate them from each other, the motor shifter may be disposed in concave portions of the U-shaped transformer stator cores and the U-shaped motor stator cores, and the transformer shifter may be disposed above the protrusions of the U-shaped transformer stator cores and the U-shaped motor stator cores.

And, preferably, the motor shifter may be formed by alternately arranging a plurality of the permanent magnets and a plurality of cores in line, and the permanent magnets and the cores are skewed by a pole pitch of "$\tau_p$" so as to generate forces in one direction.

Further, preferably, a total length of one U-type transformer stator core and one U-type motor stator core may be the same as a total length of two pairs.

Moreover, preferably, the integrated system of the present invention may further comprise power feed means for exciting the motor stator cores and the transformer stator cores.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
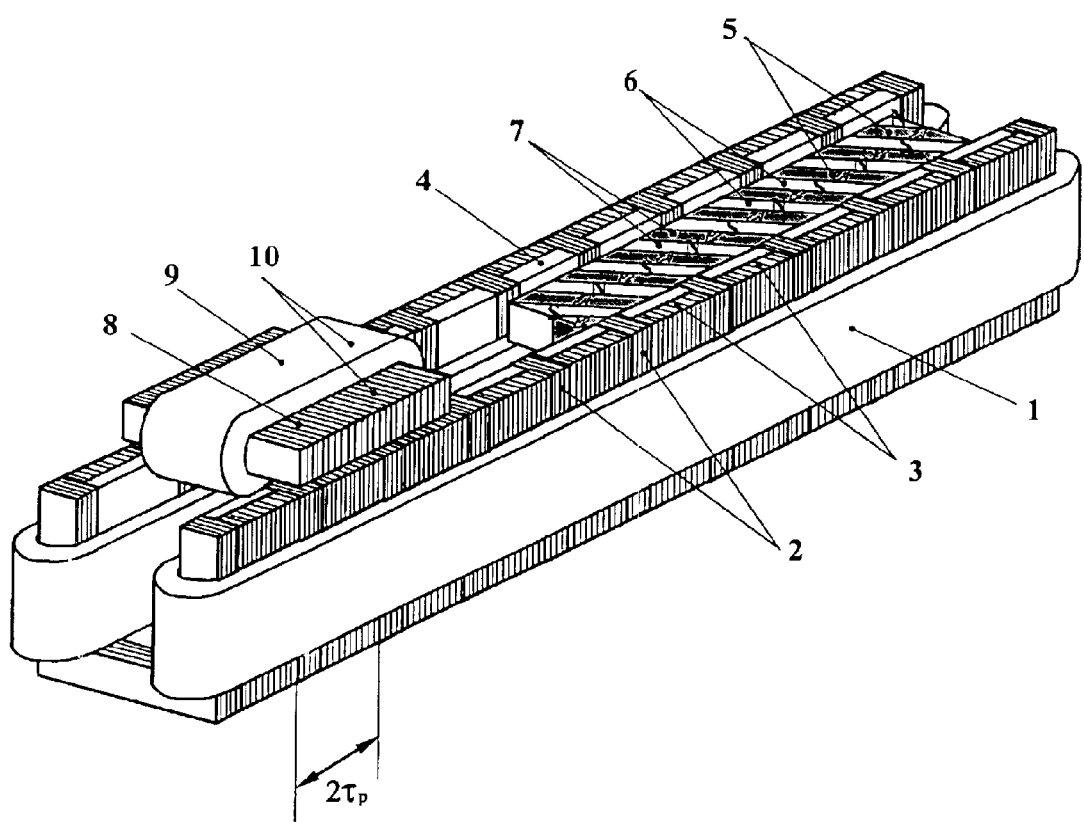
FIG. 1 is a perspective view of an integrated system of a non-contact power feed device and a permanent magnet-excited transverse flux linear motor in accordance with the present invention.

FIG. 1 is a perspective view of an integrated system of a non-contact power feed device and a permanent magnet-excited transverse flux linear motor in accordance with the present invention.

As shown in FIG. 1, a long iron core 8 is disposed at one side of a shifter 7 of a conventional permanent magnet-excited transverse flux linear motor, and a coil 9 is wound on the core 8, thereby forming secondary part of non-contact power feed device 10. The secondary part of non-contact power feed device 10, a stator coil 1, a motor stator core 2, and a transformer stator core 3 form a transformer. Herein, a stator comprises the stator coil 1, the motor stator core 2, the transformer stator core 3, and a non-magnetic material 4. When an excited current with a sine wave is supplied to the stator coil 1 so as to drive the shifter 7, a magnetic flux with a sine wave occurs in the stator comprising the components 1, 2, 3, and 4, and the core 8 of the non-contact power feed device 10, and an induced voltage is produced at the coil 9 of the non-contact power feed device 10 by the principle of the transformer.

Figure 2:
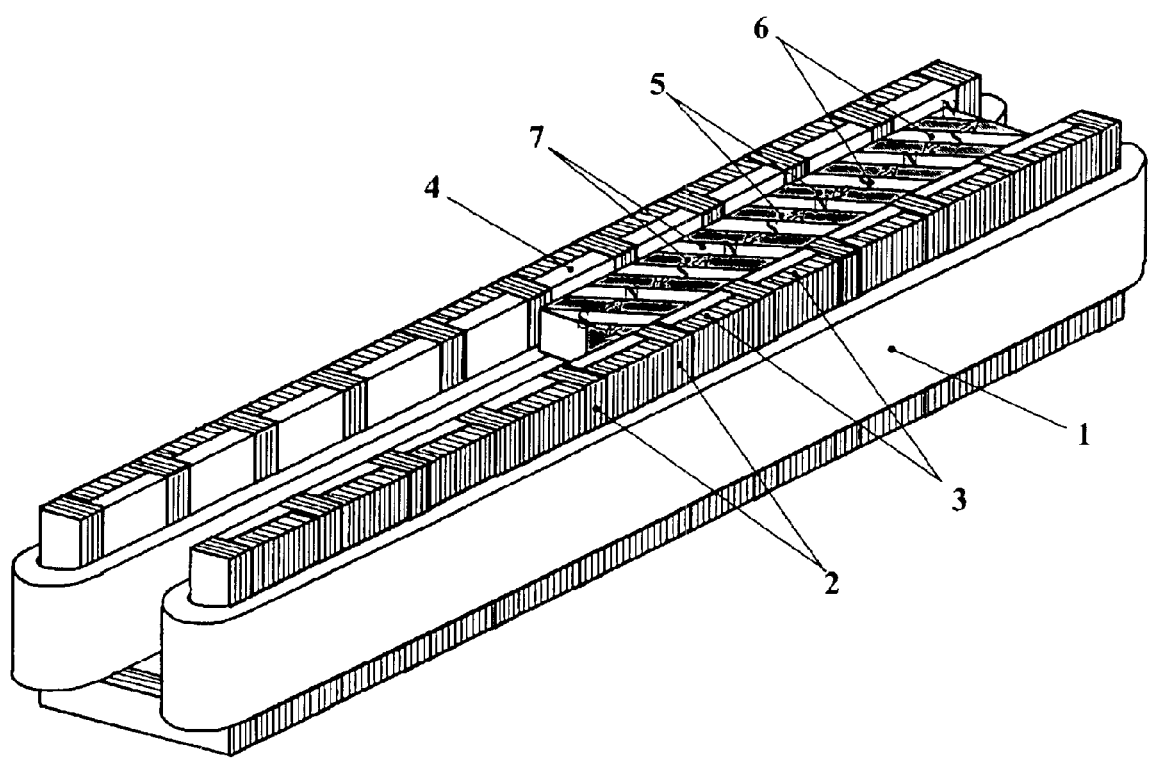
FIG. 2 is a perspective view of a motor in the integrated system of the non-contact power feed device and the permanent magnet-excited transverse flux linear motor in accordance with the present invention.

FIG. 2 is a perspective view of a motor for obtaining a driving force in the integrated system of the non-contact power feed device and the permanent magnet-excited transverse flux linear motor in accordance with the present invention. The driving force is produced at shifter cores 6. FIG. 2 generally shows a conventional permanent magnet-excited transverse flux linear motor system.

Figure 3:
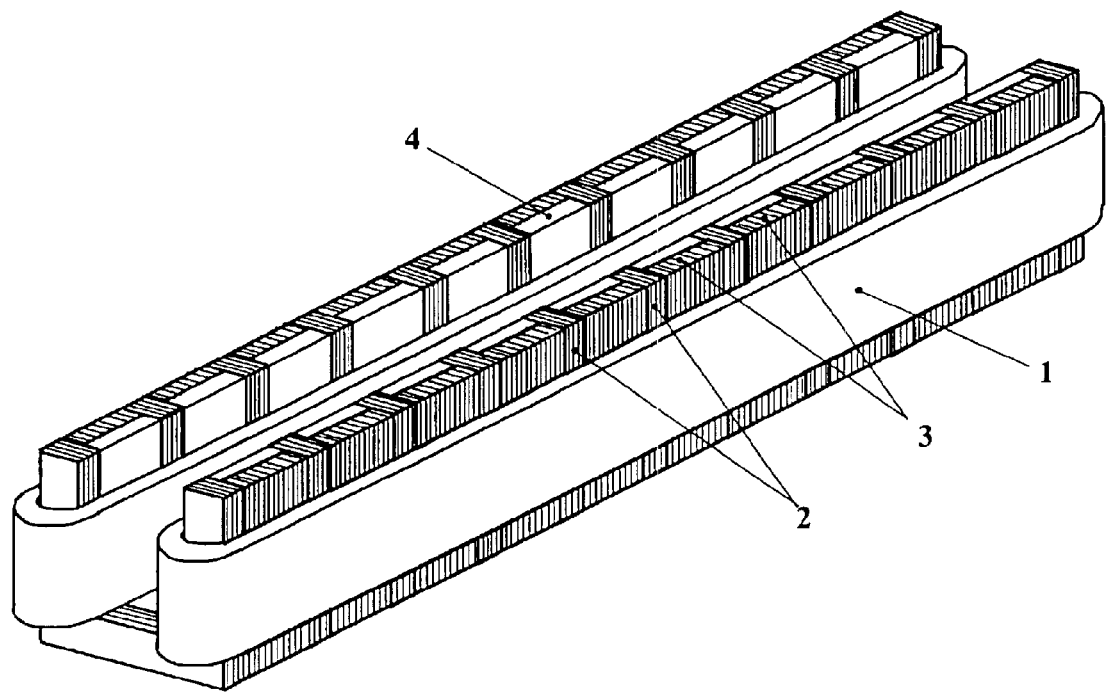
FIG. 3 is a perspective view of a stator in the integrated system of the non-contact power feed device and the permanent magnet-excited transverse flux linear motor in accordance with the present invention.

FIG. 3 is a perspective view of the stator in the integrated system of the non-contact power feed device and the permanent magnet-excited transverse flux linear motor in accordance with the present invention. The stator employed by the present invention comprises an assembly having the U-type motor stator cores 2, the transformer stator cores 3, and the non-magnetic materials 4 for separating the cores 2 and 3 from each other, and the stator coil 1 serving as a primary coil. The stator of the present invention has the same structure as a stator of the conventional permanent magnet-excited transverse flux linear motor system.

Figure 4:
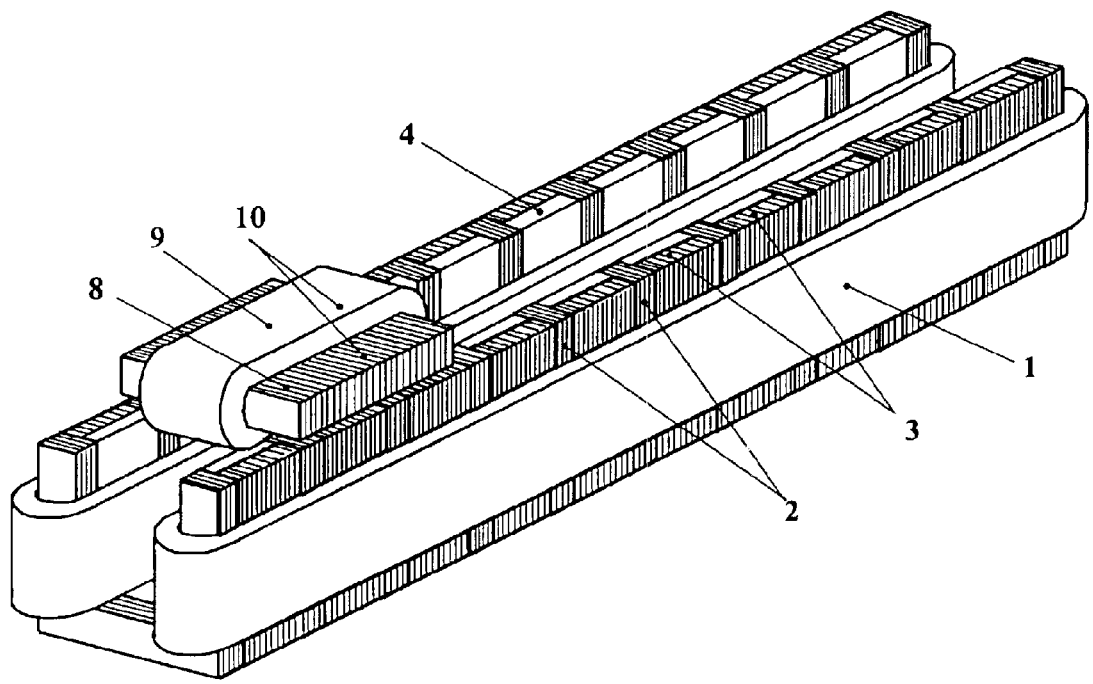
FIG. 4 is a perspective view showing the stator and the non-contact power feed device in the integrated system of the non-contact power feed device and the permanent magnet-excited transverse flux linear motor in accordance with the present invention.

FIG. 4 is a perspective view showing the stator and the non-contact power feed device in the integrated system of the non-contact power feed device and the permanent magnet-excited transverse flux linear motor in accordance with the present invention. The stator and the secondary part of non-contact power feed device of the integrated system of the present invention is used as a transformer provided with a gap therebetween, and uses the stator coil 1 as a primary coil and the coil 9 of the non-contact power feed device 10 as a secondary coil.

Figure 5A:
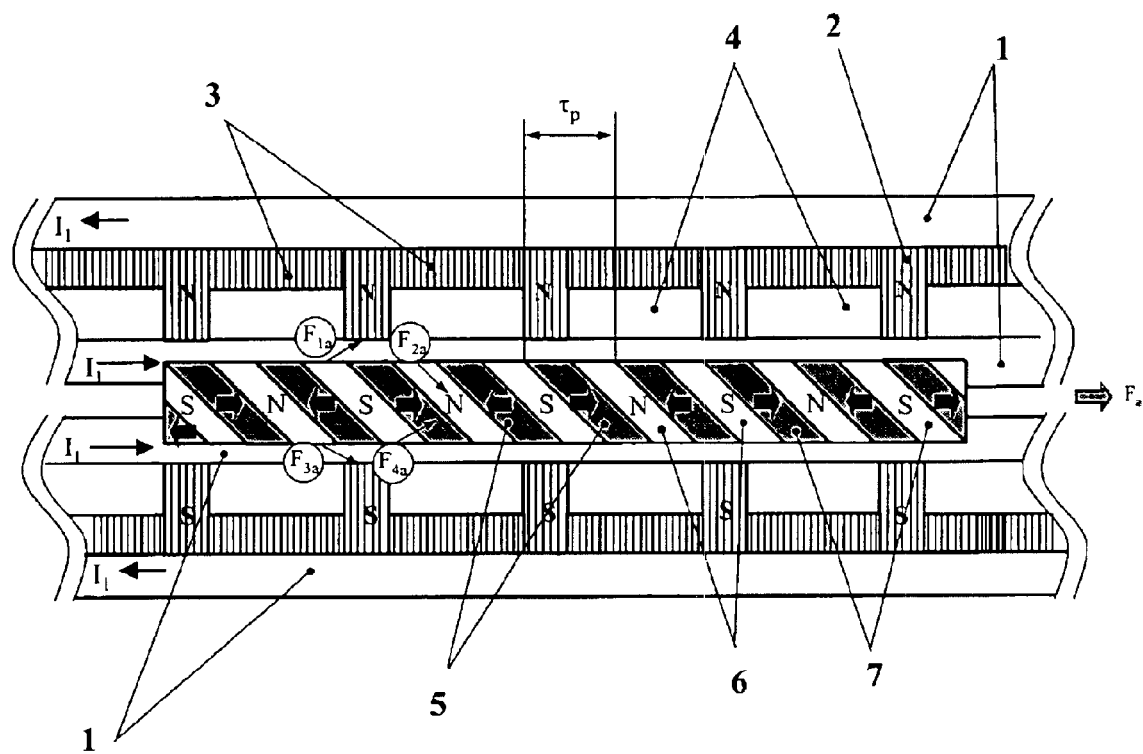
FIGS. 5a and 5b illustrate the principle of generating a driving force in the integrated system of the non-contact power feed device and the permanent magnet-excited transverse flux linear motor in accordance with the present invention.
Figure 5B:
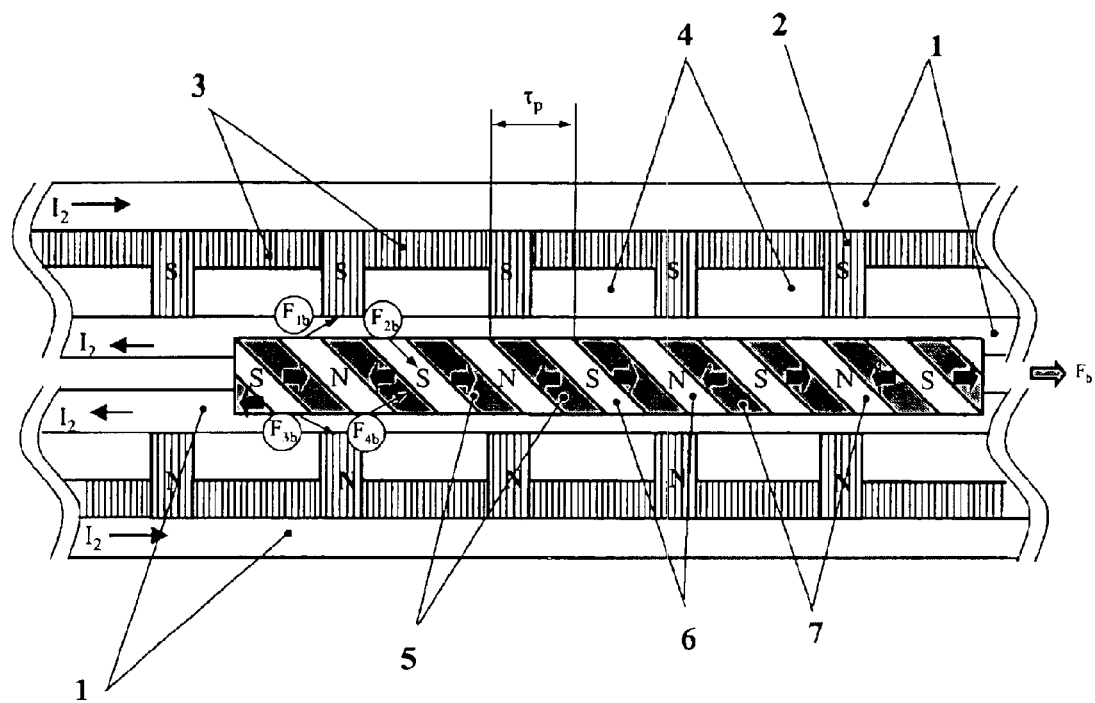

FIGS. 5a and 5b illustrate the principle of generating a driving force in the integrated system of the non-contact power feed device and the permanent magnet-excited transverse flux linear motor in accordance with the present invention. As shown in FIGS. 5a and 5b, in order to move the shifter 7 in one direction, the shifter cores 6 and permanent magnets 5 are alternately skewed by a pole pitch of "$\tau_p$" so as to generate forces in one direction.

In FIG. 5a, when a current flows in a direction of $I_1$ in the stator coil 1, the north poles are generated on the upper portions of the stator cores 2 and the south poles are generated on the lower portions of the stator cores 2 by the ampere's circuital law. That is, when the magnetic pole of the stator and the magnetic pole of the shifter are the same, a repulsive force is generated by a mutual interaction of the poles, and when the magnetic pole of the stator and the magnetic pole of the shifter are different, an attractive force is generated by a mutual interaction of the poles. Thereby, forces $F_{1a}$, $F_{2a}$, $F_{3a}$, and $F_{4a}$ are generated, and thus a resultant force $F_a$ is generated so as to move the shifter 7 in the right direction in FIG. 5*a*.

In FIG. 5*b*, when a current flows in a direction of $I_2$ in the stator coil 1, the south poles are generated on the upper portions of the stator cores 2 and the north poles are generated on the lower portions of the stator cores 2. Then, forces $F_{1b}$, $F_{2b}$, $F_{3b}$, and $F_{4b}$ are generated, and thus a resultant force $F_b$ is generated so as to move the shifter 7 in the right direction in FIG. 5*b*. Therefore, the shifter 7 makes a rectilinear motion by the current direction ($I_1$ or $I_2$) according to the positions of the shifter 7.

Figure 6:
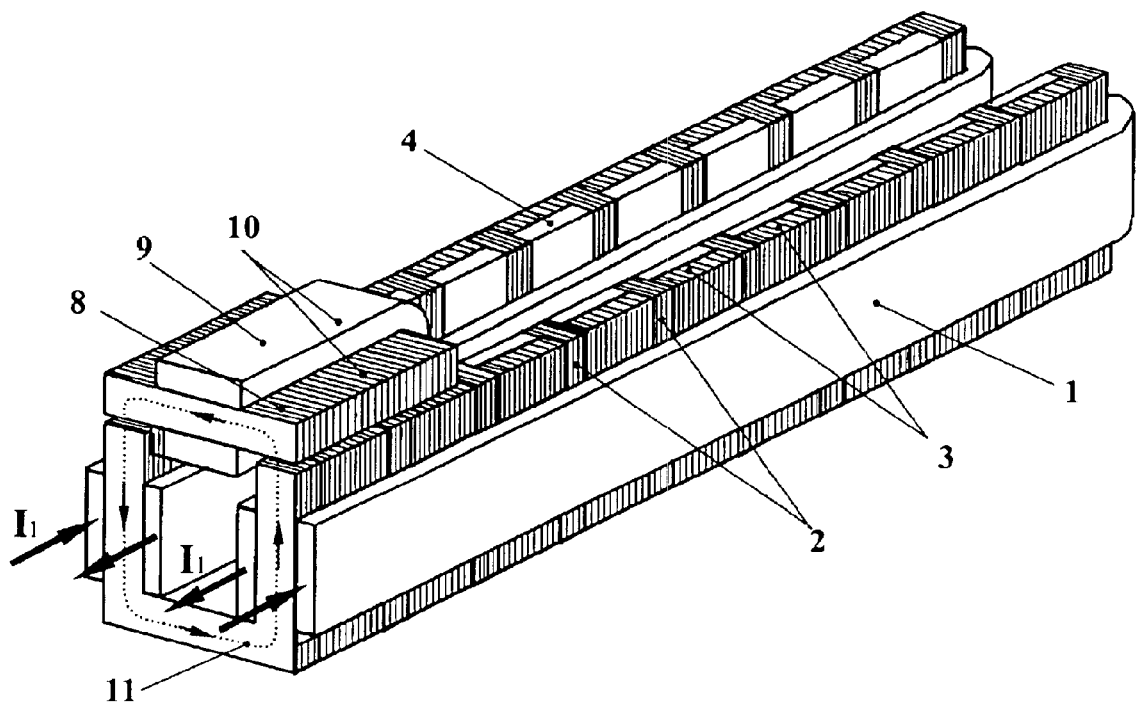
FIG. 6 illustrates the principle of feeding non-contact power in the integrated system of the non-contact power feed device and the permanent magnet-excited transverse flux linear motor in accordance with the present invention.

FIG. 6 illustrates the principle of feeding non-contact power in the integrated system of the non-contact power feed device and the permanent magnet-excited transverse flux linear motor in accordance with the present invention;

As shown in FIG. 6, the stator comprising the components 1, 2, 3, and 4, and the secondary part of non-contact power feeding equipment 10 form a transformer provided with a gap therebetween, in which the stator coil 1 is used as the primary coil and the coil 9 of the non-contact power feed device 10 is used as the secondary coil. When the current $I_1$ flows in the primary coil 1 in order to drive the shifter 7, the magnetic flux generated at the transformer stator cores 3 and the motor stator cores 2 is a magnetic flux $\bullet_a$ 11 through the secondary core 8 of the non-contact power feed device 10, which varies according to time. Therefore, an induced voltage $e_a$ is generated at the secondary coil 9 of the non-contact power feed device 10 by the principle of the transformer, and thereby allowing power to be supplied to the shifter. In describing the principle of the non-contact power feed device, it is unnecessary to consider the motion of the shifter 7, since the length of the core 8 of the non-contact power feed device 10 of the present invention is increased so that reluctance of the transformer is uniform regardless of the positions of the shifter 7.

As described above, the present invention uses the conventional structure of the permanent magnet-excited transverse flux linear motor system (referring to FIG. 2), and only installs the core 8 and the coil 9 so as to provide non-contact power. It is very simple and economical to additionally install the non-contact power feed device 10 on the conventional permanent magnet-excited transverse flux linear motor system.

Figure 7:
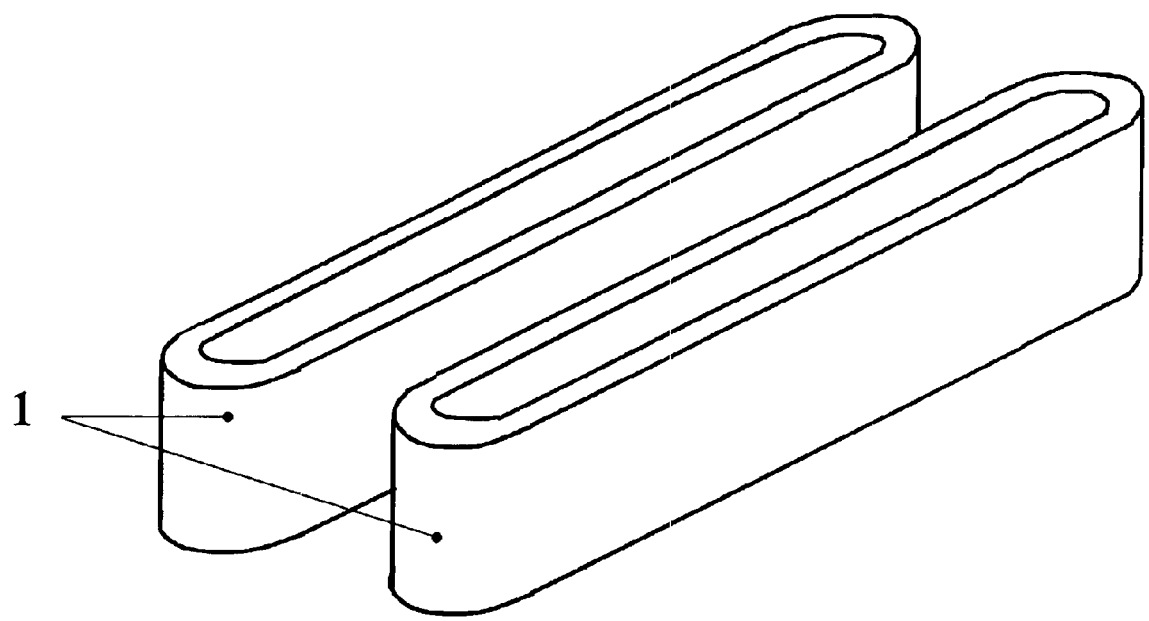
FIG. 7 is a perspective view of a primary stator coil in the integrated system of the non-contact power feed device and the permanent magnet-excited transverse flux linear motor in accordance with the present invention.

FIG. 7 is a perspective view of the primary stator coil in the integrated system of the non-contact power feed device and the permanent magnet-excited transverse flux linear motor in accordance with the present invention. As shown in FIG. 7, the stator coil 1 is formed in a long ring, and inserted into protrusions of the assembly of the U-type stator cores 2 and 3 and the non-magnetic materials 4.

Figure 8:
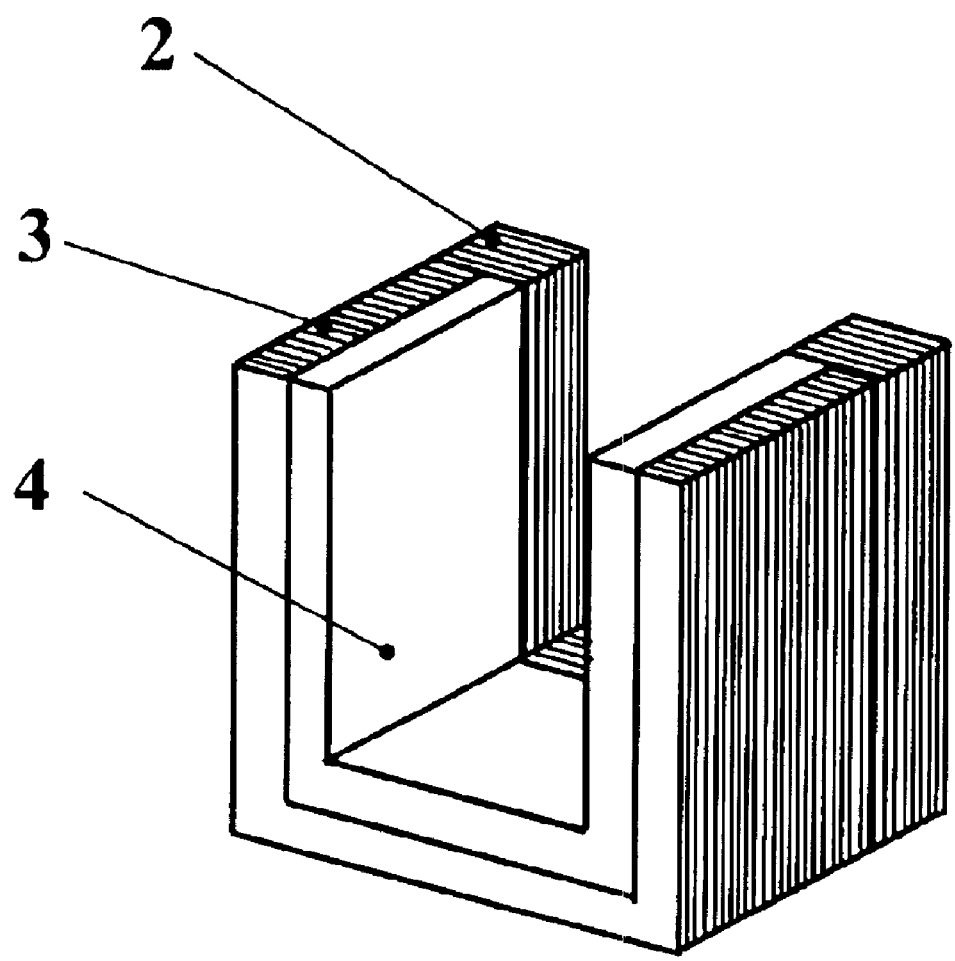
FIG. 8 is a perspective view of a primary stator core in the integrated system of the non-contact power feed device and the permanent magnet-excited transverse flux linear motor in accordance with the present invention.

FIG. 8 is a perspective view of the assembly of the motor stator core 2, the transformer stator core 3, and the non-magnetic material 4 in the integrated system of the non-contact power feed device and the permanent magnet-excited transverse flux linear motor in accordance with the present invention. As shown in FIG. 8, the non-magnetic material 4 is inserted between the motor stator core 2 and transformer stator core 3, thereby mechanically fixing them.

Figure 9:
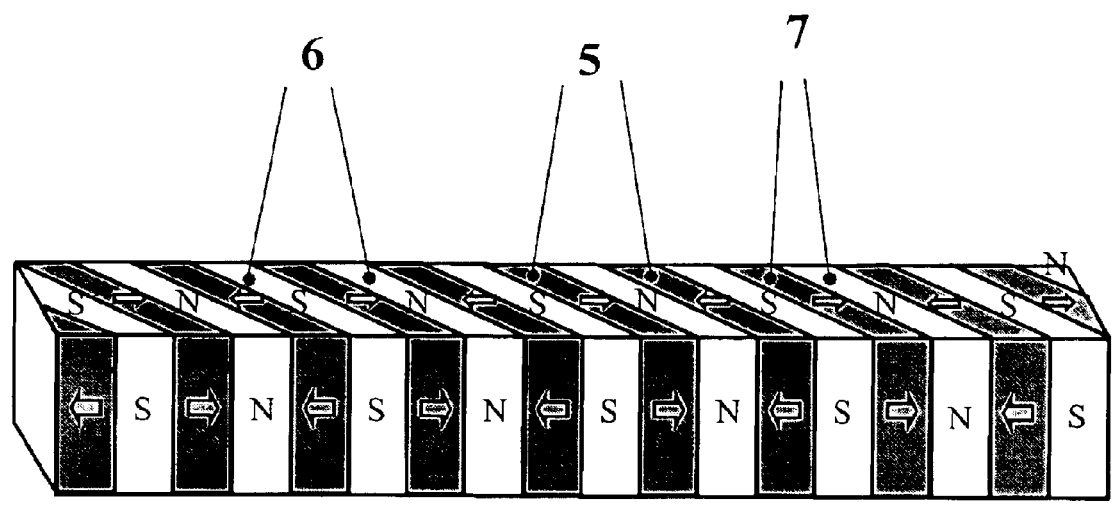
FIG. 9 is a perspective view of a shifter in the integrated system of the non-contact power feed device and the permanent magnet-excited transverse flux linear motor in accordance with the present invention.

FIG. 9 is a perspective view of the shifter in the integrated system of the non-contact power feed device and the permanent magnet-excited transverse flux linear motor in accordance with the present invention. As shown in FIG. 9, the shifter 7 has a configuration such that the rectangular permanent magnets 5 and the rectangular shifter cores 6 are alternately arranged in line so as to produce a high magnetic flux. Herein, an arrow denotes a direction of the magnetic flux generated at the permanent magnet 5. In order to move the shifter 7 in one direction, the shifter cores 6 and the permanent magnets 5 are skewed by a pole pitch of "$\tau_p$" so as to generate forces in one direction.

Figure 10:
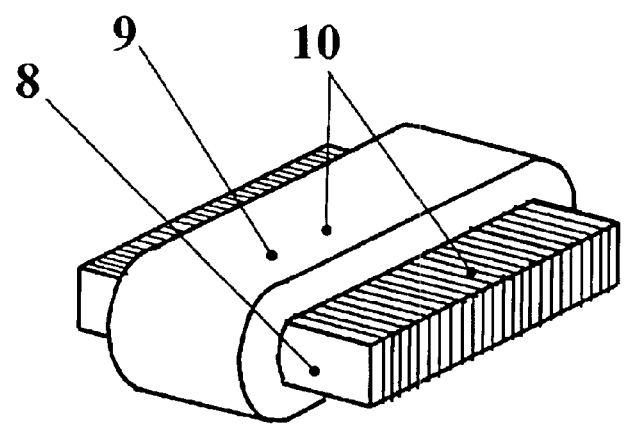
FIG. 10 is a perspective view of a secondary part of transformer in the integrated system of the non-contact power feed device and the permanent magnet-excited transverse flux linear motor in accordance with the present invention.

FIG. 10 is a perspective view of a secondary part of transformer in the integrated system of the non-contact power feed device and the permanent magnet-excited transverse flux linear motor in accordance with the present invention. As shown in FIG. 10, the secondary part of non-contact power feed device 10 is formed by the ring type secondary transformer coil 9 on the transformer core 8.

Figure 11:
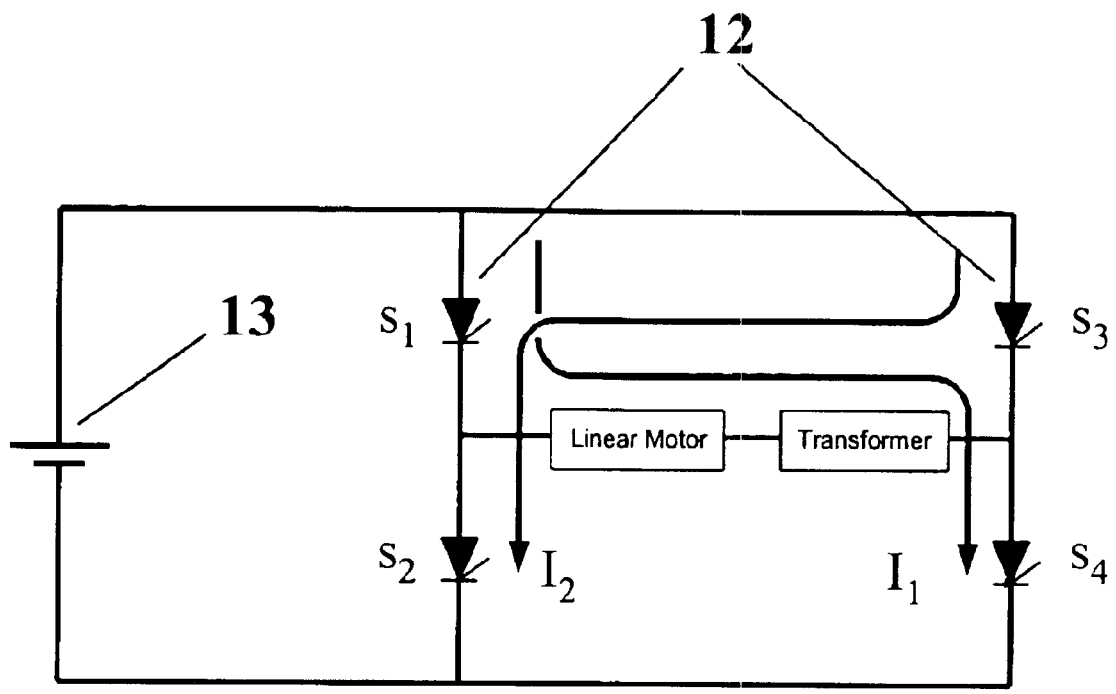
FIG. 11 is a circuit diagram illustrating a single-phase power feed in the integrated system of the non-contact power feed device and the permanent magnet-excited transverse flux linear motor in accordance with the present invention.

FIG. 11 is a circuit diagram illustrating a single-phase power feed of the integrated system of the non-contact power feed device and the permanent magnet-excited transverse flux linear motor in accordance with the present invention. Such power feed circuit is operated so as to excite the stator core 2 of the linear motor and the primary core 3 of the non-contact power feed device 10. Herein, in order to generate a current in the direction of $I_1$, $S_1$ and $S_4$ are connected, and in order to generate a current in the direction of $I_2$, $S_2$ and $S_3$ are connected.

FIGS. 12*a* to 12*d* are graphs respectively showing wave forms of an exciting current ($I_a$) of a single phase, i.e., phase a, an interlinked magnetic flux ($\bullet_a$) at the non-contact power feed device, a driving force ($F_a$), and an induced voltage ($e_a$) at the secondary portion of the non-contact power feed device according to time (t) or positions (x) of the shifter, in the integrated system of the non-contact power feed device and the permanent magnet-excited transverse flux linear motor in accordance with the present invention.

Figure 12A:
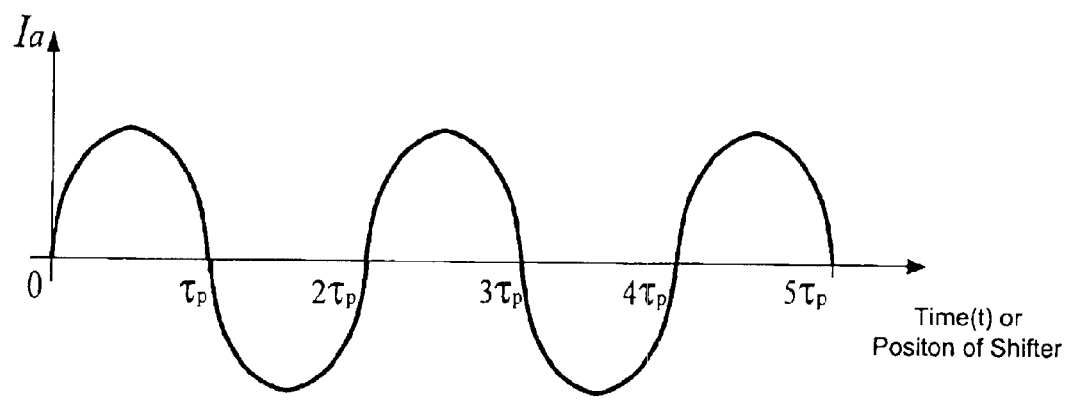
FIGS. 12a to 12d are graphs respectively showing wave forms of an exciting current ($I_a$) of a single phase, i.e., phase a, an interlinked magnetic flux ($\bullet_a$) at the non-contact power feed device, a driving force ($F_a$), and an induced voltage ($e_a$) at the secondary portion of the coil of the non-contact power feed device according to time (t) or positions (x) of the shifter, in the integrated system of the non-contact power feed device and the permanent magnet-excited transverse flux linear motor in accordance with the present invention.

FIG. 12*a* shows a wave form of the exciting current ($I_a$) of the single phase, which is supplied to the shifter according to the positions of the shifter. Herein, in order to move the shifter only in one direction, the exciting current ($I_a$) of positive is applied to the shifter in the range of $0 \sim \tau_p$, and the exciting current ($I_a$) of negative is applied to the shifter in the range of $\tau_p \sim 2\tau_p$.

Figure 12B:
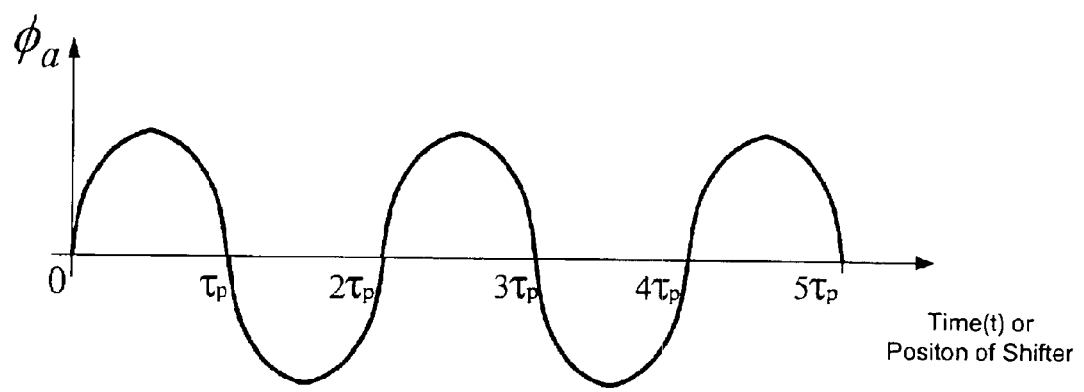

FIG. 12*b* shows a wave form of the magnetic flux ($\bullet_a$) generated at the stator cores 2 and 3 and the secondary core 8 of the non-contact power feed device by the exciting current ($I_a$). Herein, the wave form of the magnetic flux ($\bullet_a$) is the same as that of the above-described the exciting current ($I_a$).

Figure 12C:
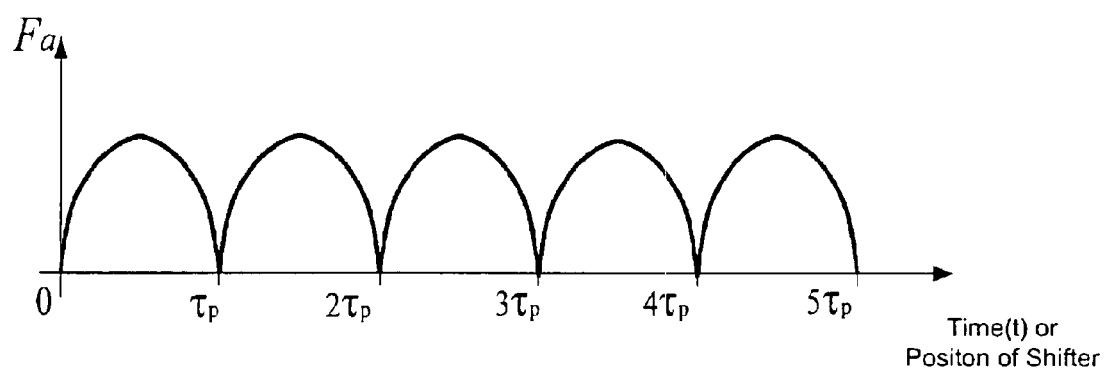

FIG. 12*c* shows a wave form of the driving force ($F_a$) of the shifter. Herein, like a general reluctance motor, the driving force ($F_a$) is 0 at positions of 0 and $\tau_p$, and the driving force ($F_a$) is the maximum at the position $\frac{1}{2}\tau_p$. Since the positive exciting current ($I_a$) is applied to the shifter in the range of $0 \sim \tau_p$, and the negative exciting current ($I_a$) is applied to the shifter in the range of $\tau_p \sim 2\tau_p$, the driving force ($F_a$) in one direction is continuously applied.

Figure 12D:
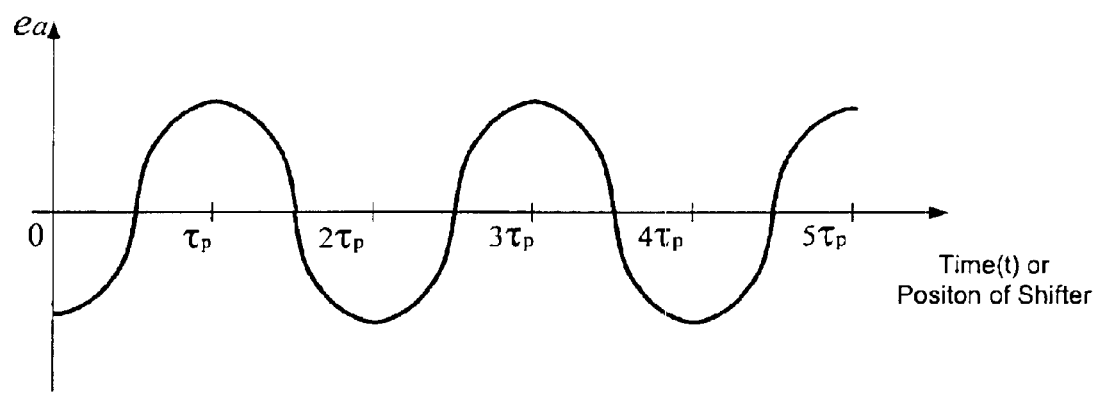

FIG. 12*d* shows a wave form of the induced voltage ($e_a$) generated at the secondary coil 9 of the non-conduct power feed device, which is obtained by differentiating the magnetic flux ($\bullet_a$). That is, the induced voltage ($e_a$) is obtained by the equation of $e_a = -N(d\bullet_a/dt)$. Herein, N denotes the winding number of the secondary coil 9 of the non-contact power feed device.

Figure 13:
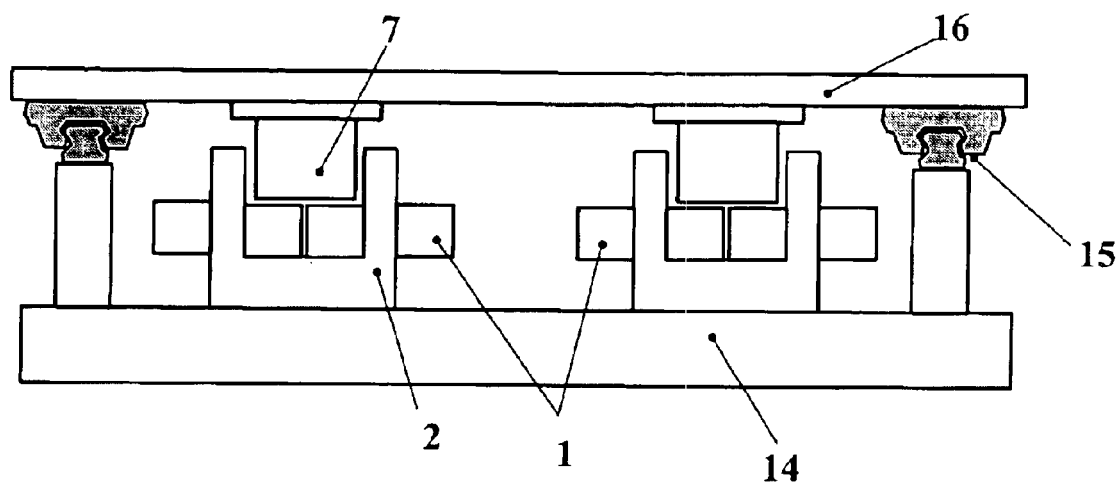
FIG. 13 is a front view of an integrated system of a two-phase non-contact power feed device and a permanent magnet-excited transverse flux linear motor in accordance with the present invention.

FIG. 13 is a front view of a integrated system of a two-phase non-contact power feed device and a permanent magnet-excited transverse flux linear motor in accordance with the present invention. The motor-side shifter 7 and the transformer-side shifter 10 of each phase are connected to each other by a shifter supporter 16, and make a linear motion by linear bearing 15. Two phases are disposed so that a moving distance in each direction is $\tau_p/2$, thereby reducing thrust ripple of the shifter shown in FIG. 12c.

Figure 14:
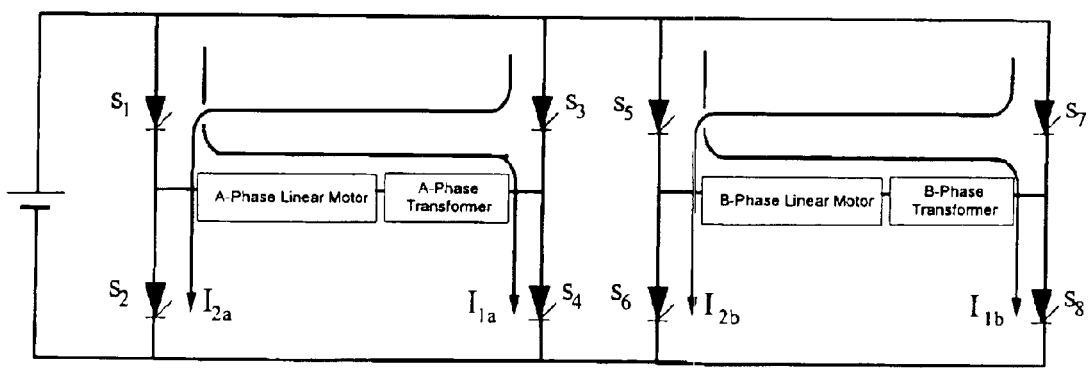
FIG. 14 is a circuit diagram illustrating a power feed in the integrated system of the two-phase non-contact power feed device and the permanent magnet-excited transverse flux linear motor in accordance with the present invention.

FIG. 14 is a circuit diagram illustrating a power feed to a primary stator coil in the integrated system of the two-phase non-contact power feed device and the permanent magnet-excited transverse flux linear motor in accordance with the present invention. Herein, the stator core of the linear motor and the primary core of the non-contact power feed device are simultaneously magnetized. Since an operating principle of such circuit diagram is the same as that of FIG. 11, its description is omitted.

FIGS. 15a to 15d are graphs respectively showing wave forms of exciting currents ($I_a$ and $I_b$) of phases a and b, interlinked magnetic fluxes ($\bullet_a$ and $\bullet_b$) of the phases a and b in the non-contact power feed device, driving forces ($F_a$, $F_b$, and $F_T$), and induced voltages ($e_a$ and $e_b$) at the secondary portion of the non-contact power feed device according to time (t) or positions (x) of the shifter, in the integrated system of the two-phase non-contact power feed device and the permanent magnet-excited transverse flux linear motor in accordance with the present invention.

Figure 15A:
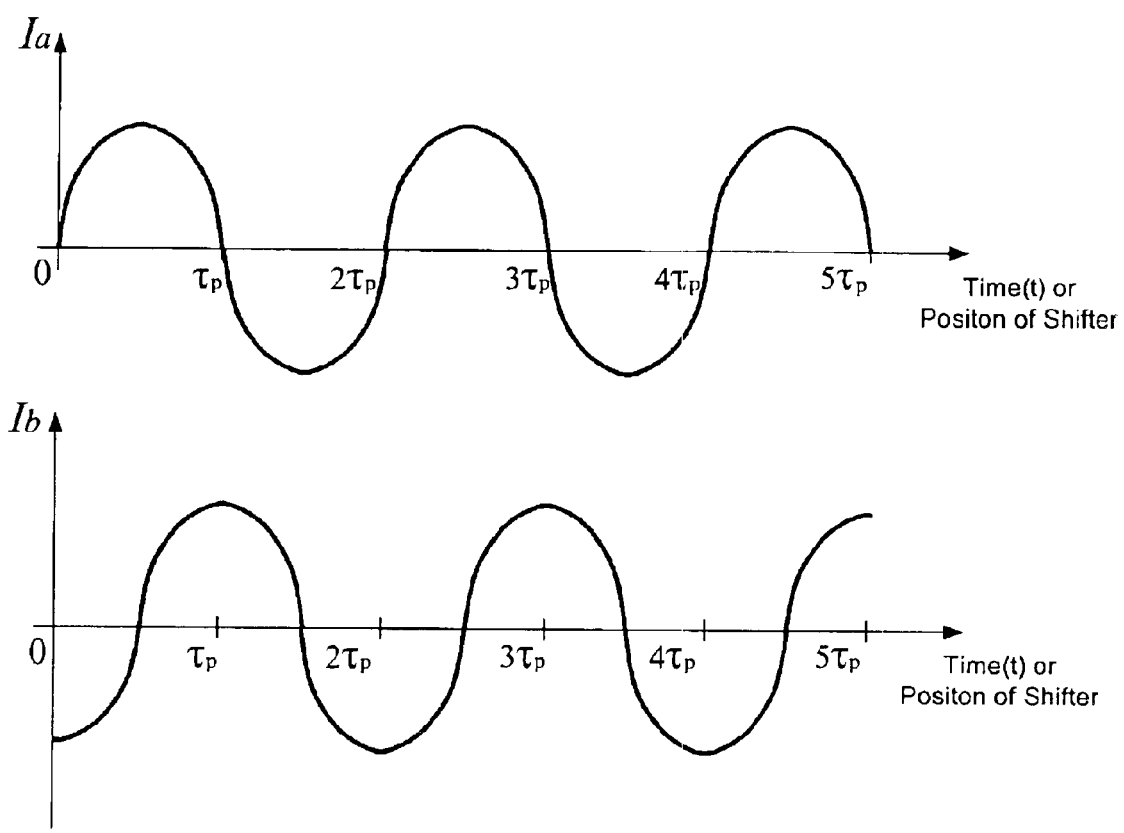
FIGS. 15a to 15d are graphs respectively showing wave forms of exciting currents ($I_a$ and $I_b$) of two phases, i.e., phases a and b, interlinked magnetic fluxes ($\bullet_a$ and $\bullet_b$) at the non-contact power feed device, driving forces ($F_a$, $F_b$, and $F_T$), and induced voltages ($e_a$ and $e_b$) at the secondary portion of the non-contact power feed device according to time (t) or positions (x) of the shifter, in the integrated system of the two-phase non-contact power feed device and the permanent magnet-excited transverse flux linear motor in accordance with the present invention.

FIG. 15a shows wave forms of the exciting currents ($I_a$ and $I_b$) of the two phases, which are supplied according to the positions of the shifter. Herein, in order to move the shifter only in one direction and to reduce the thrust ripple, each of the exciting currents ($I_a$ and $I_b$) of the two phases has a phase difference of $\tau_p/2$ according to the positions of the shifter.

Figure 15B:
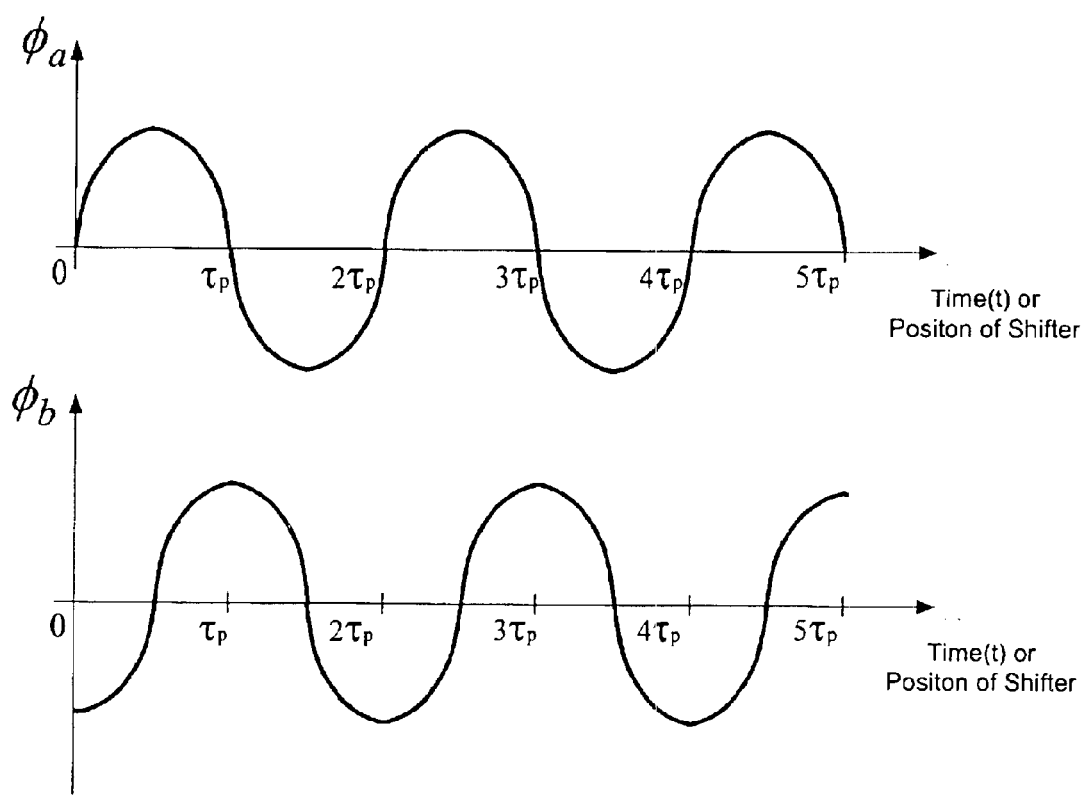

FIG. 15b shows wave forms of the magnetic fluxes ($\bullet_a$ and $\bullet_b$) of two phases generated at the stator cores 2 and 3 and the core 8 of the non-contact power feed device when the exciting currents ($I_a$ and $I_b$) are applied to the corresponding phases as shown in FIG. 15a.

Figure 15C:
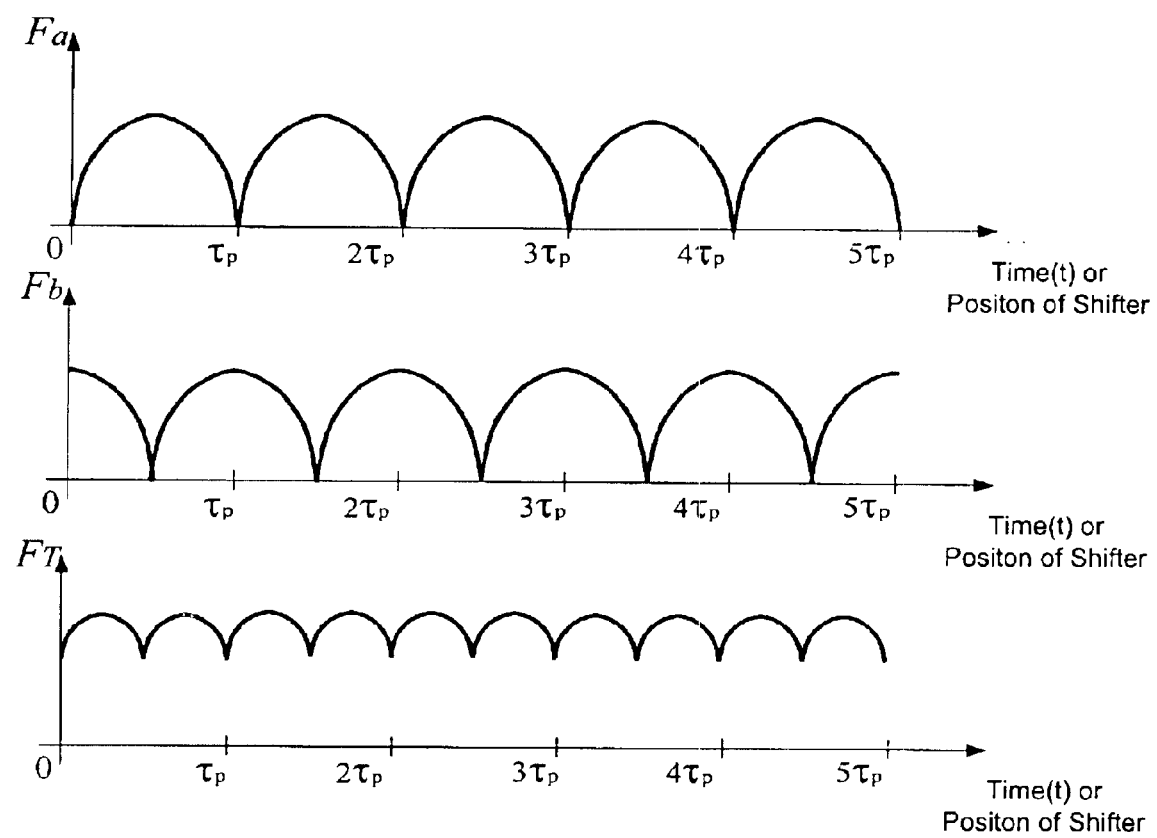

FIG. 15c shows wave forms of the driving forces ($F_a$ and $F_b$) generated in two phases and the resultant total force ($F_T$). The resultant total force ($F_T$) is continuous and approximately doubles the driving force of each phase.

Figure 15D:
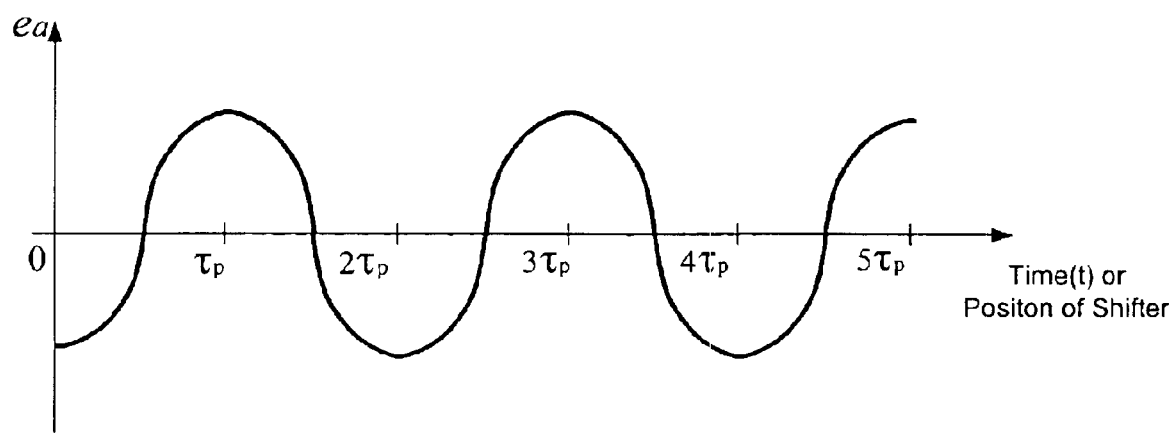
Figure 15D:
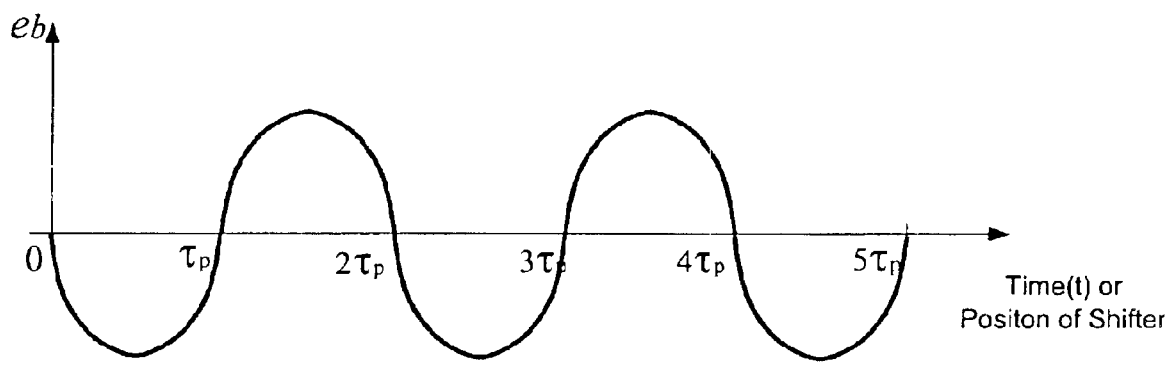

FIG. 15d shows wave forms of the induced voltages ($e_a$ and $e_b$) of two phases generated at the secondary coil 9 of the non-conduct power feed device, which is obtained by differentiating the magnetic fluxes ($\bullet_a$ and $\bullet_b$).

The integrated system of the non-contact power feed device and the permanent magnet-excited transverse flux linear motor in accordance with the present invention may be applied in a feeder used in a manufacturing process of semiconductors, a magnetic levitation train, an elevator, a harbor crane, other linear motor systems, etc.

As apparent from the above description, the present invention provides an integrated system of a non-contact power feed device and a permanent magnet-excited transverse flux linear motor, in which a conventional structure of the permanent magnet-excited transverse flux linear motor is still used and a long core and a coil wound on the core are additionally installed so as to supply non-contact type power, thereby being advantageous in terms of simplification of its structure and economic efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated system of a non-contact power feed device and a permanent magnet-excited transverse flux linear motor, comprising:

a permanent magnet-excited transverse flux linear motor including:
a motor shifter having permanent magnets and cores; and
a motor stator having a motor stator core and a stator coil wound on the motor stator core; and
a non-contact power feed device including:
a transformer shifter having the secondary core and the secondary coil of transformer, and moving together with the motor shifter; and
a transformer stator having a transformer stator core and a transformer stator primary coil wound on the core,
wherein the transformer shifter is separated from the transformer stator by a gap.

2. The integrated system of the non-contact power feed device and the permanent magnet-excited transverse flux linear motor as set forth in claim 1,
wherein the transformer stator core is jointed integrally with the motor stator core.

3. The integrated system of the non-contact power feed device and the permanent magnet-excited transverse flux linear motor as set forth in claim 2,
wherein the motor stator coil serves as the transformer stator primary coil.

4. The integrated system of the non-contact power feed device and the permanent magnet-excited transverse flux linear motor as set forth in claim 2,
wherein the transformer stator core and the motor stator core are U-shaped, and the U-shaped transformer stator cores and the U-shaped motor stator cores are alternately and continuously arranged in line.

5. The integrated system of the non-contact power feed device and the permanent magnet-excited transverse flux linear motor as set forth in claim 4,
wherein each of the motor stator coil and the transformer stator primary coil includes a pair of coils wound on two protrusions of the motor stator cores and the transformer stator cores.

6. The integrated system of the non-contact power feed device and the permanent magnet-excited transverse flux linear motor as set forth in claim 4,
wherein a non-magnetic material is interposed between the transformer stator core and the motor stator core so as to separate them from each other.

7. The integrated system of the non-contact power feed device and the permanent magnet-excited transverse flux linear motor as set forth in claim 4,
wherein the motor shifter is disposed in concave portions of the U-shaped transformer stator cores and the U-shaped motor stator cores.

8. The integrated system of the non-contact power feed device and the permanent magnet-excited transverse flux linear motor as set forth in claim 4,
wherein the transformer shifter is disposed above the protrusions of the U-shaped transformer stator cores and the U-shaped motor stator cores.

9. The integrated system of the non-contact power feed device and the permanent magnet-excited transverse flux linear motor as set forth in claim 5,
wherein the motor shifter is formed by alternately arranging a plurality of the permanent magnets and a plurality of cores in line.

10. The integrated system of the non-contact power feed device and the permanent magnet-excited transverse flux linear motor as set forth in claim 9,
wherein the permanent magnets and the cores are skewed by a pole pitch of "$\tau_p$" so as to move the motor shifter in one direction.

11. The integrated system of the non-contact power feed device and the permanent magnet-excited transverse flux linear motor as set forth in claim 9, wherein a total length of one U-type transformer stator core and one U-type motor stator core is the same as a total length of two pairs, each pair including a permanent magnet and a core of the motor shifter.

12. The integrated system of the non-contact power feed device and the permanent magnet-excited transverse flux linear motor as set forth in claim 1, further comprising power feed means for exciting the motor stator cores and the transformer stator cores.

13. An integrated system of a poly-phase non-contact power feed device and a permanent magnet-excited transverse flux linear motor, comprising:

a permanent magnet-excited transverse flux linear motor including:

a motor shifter having permanent magnets and cores; and a motor stator having a motor stator core and a stator coil wound on the motor stator core;

at least two non-contact power feed devices, each device including:

a transformer shifter having a secondary core and a secondary coil wound on the core, and moving together with the motor shifter; and a transformer stator having a transformer stator core and a transformer stator primary coil wound on the core, wherein the transformer shifter is separated from the transformer stator by a gap;

shifter supporting means for supporting the motor shifter and the transformer shifter; and stator supporting means for supporting the motor stator.

14. The integrated system of the poly-phase non-contact power feed device and the permanent magnet-excited transverse flux linear motor as set forth in claim 13, wherein the shifter supporting means is supported by the stator supporting means through linear bearings.

15. The integrated system of the poly-phase non-contact power feed device and the permanent magnet-excited transverse flux linear motor as set forth in claim 13, wherein the transformer stator core is jointed integrally with the motor stator core.

16. The integrated system of the poly-phase non-contact power feed device and the permanent magnet-excited transverse flux linear motor as set forth in claim 15, wherein the motor stator coil serves as the transformer stator primary coil.

17. The integrated system of the poly-phase non-contact power feed device and the permanent magnet-excited transverse flux linear motor as set forth in claim 15, wherein the transformer stator cores and the motor stator cores are U-shaped, and the U-shaped transformer stator cores and the U-shaped motor stator cores are alternately and continuously arranged in line.

18. The integrated system of the poly-phase non-contact power feed device and the permanent magnet-excited transverse flux linear motor as set forth in claim 17, wherein each of the motor stator coil and the transformer stator primary coil includes a pair of coils wound on two protrusions of the motor stator cores and the transformer stator cores.

19. The integrated system of the poly-phase non-contact power feed device and the permanent magnet-excited transverse flux linear motor as set forth in claim 17, wherein a non-magnetic material is interposed between the transformer stator core and the motor stator core so as to separate them from each other.

20. The integrated system of the poly-phase non-contact power feed device and the permanent magnet-excited transverse flux linear motor as set forth in claim 17, wherein the motor shifter is disposed in concave portions of the U-shaped transformer stator cores and the U-shaped motor stator cores.

21. The integrated system of the poly-phase non-contact power feed device and the permanent magnet-excited transverse flux linear motor as set forth in claim 17, wherein the transformer shifter is disposed above the protrusions of the U-shaped transformer stator cores and the U-shaped motor stator cores.

22. The integrated system of the poly-phase non-contact power feed device and the permanent magnet-excited transverse flux linear motor as set forth in claim 18, wherein the motor shifter is formed by alternately arranging a plurality of the permanent magnets and a plurality of cores in line.

23. The integrated system of the poly-phase non-contact power feed device and the permanent magnet-excited transverse flux linear motor as set forth in claim 22, wherein the permanent magnets and the cores are skewed by a pole pitch of "$\tau_p$" so as to move the motor shifter in one direction.

24. The integrated system of the poly-phase non-contact power feed device and the permanent magnet-excited transverse flux linear motor as set forth in claim 22, wherein a total length of one U-type transformer stator core and one U-type motor stator core is the same as a total length of two pairs.

25. The integrated system of the poly-phase non-contact power feed device and the permanent magnet-excited transverse flux linear motor as set forth in claim 13, further comprising power feed means for exciting the motor stator cores and the transformer stator cores.

* * * * *